(12) United States Patent
Chen (10) Patent No.: US 10,949,368 B2
(45) Date of Patent: *Mar. 16, 2021

(54) INPUT/OUTPUT COMMAND REBALANCING IN A VIRTUALIZED COMPUTER SYSTEM

(71) Applicant: Red Hat, Inc., Raleigh, NC (US)

(72) Inventor: Huamin Chen, Westborough, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/724,874

(22) Filed: Dec. 23, 2019

(65) Prior Publication Data

US 2020/0125516 A1 Apr. 23, 2020

Related U.S. Application Data

(63) Continuation of application No. 15/276,323, filed on Sep. 26, 2016, now Pat. No. 10,515,038.

(51) Int. Cl.
*G06F 12/00* (2006.01)
*G06F 13/37* (2006.01)
*G06F 3/06* (2006.01)
*G06F 9/455* (2018.01)

(52) U.S. Cl.
CPC .............. *G06F 13/37* (2013.01); *G06F 3/061* (2013.01); *G06F 3/067* (2013.01); *G06F 3/0659* (2013.01); *G06F 2009/45579* (2013.01)

(58) Field of Classification Search
CPC .......... G06F 13/00; G06F 3/00; G06F 3/0659; G06F 3/061; G06F 11/3041; G06F 13/1642; G06F 13/26; G05B 19/054; H04L 47/24

USPC ............................. 710/5, 15, 36, 117, 38–39
See application file for complete search history.

(56) References Cited

U.S. PATENT DOCUMENTS

| 6,434,637 | B1 | 8/2002 | D'Errico |
| 9,268,495 | B2 | 2/2016 | Vogan |
| 9,317,204 | B2 * | 4/2016 | Hahn .................... G06F 3/0679 |
| 2013/0262649 | A1 * | 10/2013 | Shimmitsu .......... H04L 41/5022 709/223 |
| 2015/0127863 | A1 | 5/2015 | Sokol, Jr. et al. |
| 2017/0026469 | A1 | 1/2017 | Usgaonkar et al. |

* cited by examiner

*Primary Examiner* — Tim T Vo
*Assistant Examiner* — Kim T Huynh
(74) *Attorney, Agent, or Firm* — K&L Gates LLP (57) ABSTRACT

The present disclosure provides new methods and systems for input/output command rebalancing in virtualized computer systems. For example, an I/O command may be received by a rebalancer from a virtual queue in a container. The container may be in a first virtual machine. A second I/O command may be received from a second virtual queue in a second container which may be located in a second virtual machine. The rebalancer may detect a priority of the first I/O command and a priority of the second I/O command. The rebalancer may then assign an updated priority each I/O command based on a quantity of virtual queues in the virtual machine of origin and a quantity of I/O commands in the virtual queue of origin. The rebalancer may dispatch the I/O commands to a physical queue.

20 Claims, 6 Drawing Sheets

INPUT/OUTPUT COMMAND REBALANCING IN A VIRTUALIZED COMPUTER SYSTEM

CROSS REFERENCES TO RELATED APPLICATIONS

This application is a continuation of and claims priority to and the benefit of U.S. patent application Ser. No. 15/276,323, filed on Sep. 26, 2016, the entire content of which is hereby incorporated by reference.

BACKGROUND

The present disclosure relates generally to the management of input/output (I/O) commands in virtualized computer system. A typical system may include multiple virtual machines, and each virtual machine may have one or more virtual queues. Each queue may include I/O commands originating from a container or an application running in the virtual machine. The I/O commands may have priorities respectively associated with each of the I/O commands. The priorities may control, in part, the order the I/O commands are processed on the physical layer of the system.

SUMMARY

The present disclosure provides new and innovative methods and systems for managing I/O commands in a virtualized computer system. For example, in a method of queuing I/O commands, a rebalancer may receive a first I/O command from a first virtual queue that is in a first container or application. The first container or application may be in a first virtual machine. The rebalancer may also receive a second I/O command from a second virtual queue in a second container or application in a second virtual machine. The rebalancer may detect a first priority of the first I/O command and a second priority of the second I/O command. The rebalancer may then assign a first updated priority to the first I/O command and a second updated priority to the second I/O command. The first updated priority may be assigned based on a first quantity of virtual queues in the first virtual machine and a first quantity of I/O commands in the first virtual queue. The second updated priority may be assigned based on a second quantity of virtual queues in the second virtual machine and a second quantity of I/O commands in the second virtual queue. The rebalancer may dispatch the first I/O command to a first physical queue and the second I/O command to a second physical queue.

Additional features and advantages of the disclosed method and apparatus are described in, and will be apparent from, the following Detailed Description and the Figures.

DETAILED DESCRIPTION

At runtime, containers or applications may be assigned to resource control groups. Resource control groups may determine how I/O commands from containers or applications are prioritized. Containers are often deployed on virtual machines, on both public and private cloud based networks, such as Amazon™ EC2™, Google™ Container Engine, Microsoft™ Azure™ and OpenStack™ Magnum. The priorities of I/O commands in virtualized systems are not consistently honored and, for example, I/O commands issued from a virtual machine with more virtual queues may be processed at a less frequent interval than I/O commands issued from a virtual machine with fewer queues and fewer I/O commands in those queues. This may result in the failure of I/O balancing policies in place. Such a problem may be created by the virtualization of the computer system, as the commands are transferred from a virtual layer to a physical layer. The transfer may be accomplished by software, known as a hypervisor, which serves as a layer between the virtual layer of the virtualized system and the physical hardware layer upon which the system runs. The hypervisor may assign I/O commands to different processors, by way of different physical queues, and schedule the execution of such commands on the physical layer with the help of a scheduler. The scheduler may not be aware of the underlying application or container, and accordingly, may not be able to determine the container priority, application priority, length of I/O queues, and quantity of virtualized queues. As such, a scheduler cannot ensure I/O commands are processed based on their true priorities. A weighted round robin may be used to prioritize commands, however, a weighted round robin may only consider the command priority and is not able to consider the container priority, application priority, length of I/O queues, and quantity of virtualized queues. As such, a weighted round robin cannot ensure I/O commands are processed based on their true priorities.

The present disclosure addresses the above discussed problem using a rebalancer to recalculate the weight of each I/O command and issue a new, updated priority to the I/O command, ensuring that I/O commands are processed according to their true priorities. To accomplish this, the rebalancer may detect a quantity of virtual queues present in a virtual machine from which an I/O command originates. The rebalancer may further detect the quantity of I/O commands in each virtual queue sending I/O commands to the rebalancer and a container priority of a container from which an I/O command originates. In the case of applications instead of containers, the rebalancer may detect an application priority of an application from which an I/O command originates. The rebalancer may further detect a command priority of the I/O command.

Rebalancer may detect a priority associated with each I/O command. The command priority may be found in an I/O command header. Rebalancer may also detect an application priority of an application from which the I/O command originates. A high application priority may be associated with a real-time application such as a video-streaming application, a database operation application, or a disk maintenance application. A low application priority may be associated with an application such as a word processing application, a data backup application, or a file indexing application.

The rebalancer may then assign an updated priority to each I/O command received by the rebalancer. The updated priority may be based on the information detected by the rebalancer. Accordingly, with the updated priorities, I/O commands may be processed according to their priority.

The rebalancer may be part of a storage controller in a Non-Volatile Memory Express (NVMe) system. In a virtualized system, the rebalancer may enforce some of the failed I/O balancing policies that fail as a result of the virtualization of the system. The rebalancer may accomplish this by detecting a container priority, application priority, length of I/O queues, and quantity of virtualized queues and then assigning an updated priority to an I/O command. Thus the rebalancer ensures that I/O commands are processed based on their true priorities. Additionally, the rebalancer may be part of an integrated device electronics (IDE) storage controller or a small computer system interface (SCSI) storage controller. The rebalancer may be part of the storage controller or alternatively, the rebalancer may be a separate component in the hardware layer and coordinate work with the storage controller.

Figure 1:
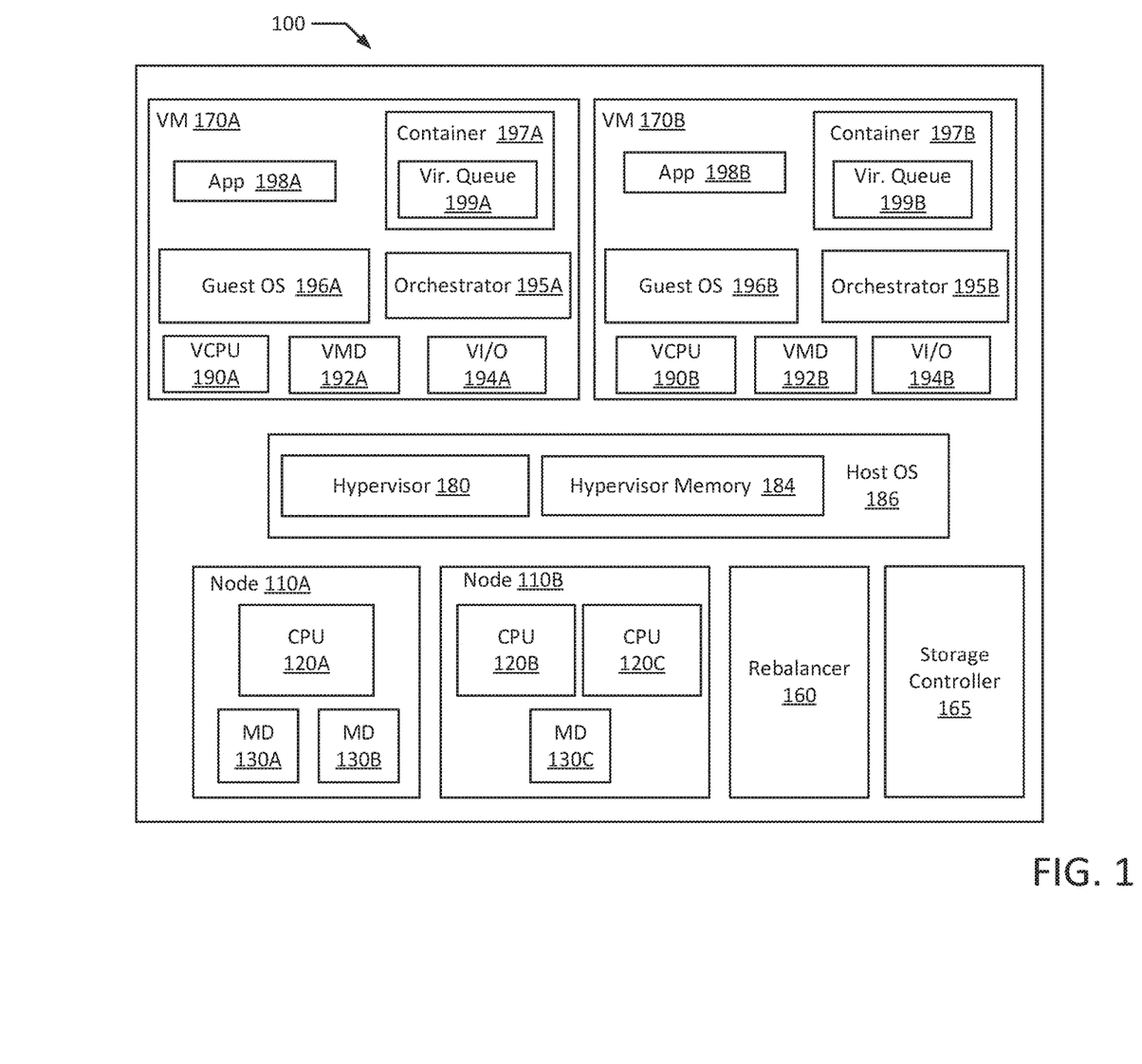
FIG. 1 is a block diagram of a virtualized computer system according to an example of the present disclosure.

FIG. 1 depicts a high level system diagram of an example virtualization computer system 100. The virtualization computer system 100 may include one or more interconnected nodes 110A-B. Each node 110A-B may in turn include one or more physical processors (e.g., CPU 120A-C) communicatively coupled to memory devices (e.g., MD 130A-C) and input/output devices (e.g., I/O 140A-B). Each node 110A-B may be connected to a rebalancer 160 and a storage controller 165.

As used herein, physical processor or processor 120A-C refers to a device capable of executing instructions encoding arithmetic, logical, and/or I/O operations or commands. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-E refers to a volatile or non-volatile memory device, such as RAM, ROM, EEPROM, or any other device capable of storing data. As discussed herein, I/O device 140A-B refers to a device capable of providing an interface between one or more processor pins and an external device, the operation of which is based on the processor inputting and/or outputting binary data.

Processors 120A-C may be interconnected using a variety of techniques, ranging from a point-to-point processor interconnect, to a system area network, such as an Ethernet-based network. Local connections within each node 110A-B, including the connections between a processor 120A and a memory device 130A-B and between a processor 120A and a rebalancer 160 and/or storage controller 165 may be provided by one or more local buses of suitable architecture, for example, peripheral component interconnect (PCI). As used herein, a device of the host OS 186, or host device, may refer to CPU 120A-C, MD 130A-C, rebalancer 160, storage controller 165, a software device, and/or a hardware device.

As noted above, computer system 100 may run one virtual machine 170A, or multiple virtual machines 170A-B, by executing a software layer (e.g., hypervisor 180) above the hardware and below the virtual machine 170A-B, as schematically shown in FIG. 1. In an example, the hypervisor 180 may be a component of the host operating system 186 executed by the computer system 100. In another example, the hypervisor 180 may be provided by an application running on the operating system 186, or may run directly on the computer system 100 without an operating system beneath it. The hypervisor 180 may virtualize the physical layer, including processors, memory, and I/O devices, and present this virtualization to a virtual machine 170A-B as devices, including virtual processors 190A-B, virtual memory devices 192A-B, and/or virtual I/O devices 194A-B.

In an example, a virtual machine 170 may execute a guest operating system 196A which may utilize the underlying VCPU 190A, VIVID 192A, and VI/O 194A. One or more applications 198A-B may be running on a virtual machine 170 under the respective guest operating system 196A. Processor virtualization may be implemented by the hypervisor 180 scheduling time slots on one or more physical processors 120A-C such that, from the guest operating system's perspective, those time slots are scheduled on a virtual processor 190A. Further, I/O command virtualization may be implemented by the hypervisor 180 and may further be managed by rebalancer 160. Rebalancer 160 may manage a command queue for the system 100. Rebalancer 160 may be a hardware component on the physical layer of system 100. Rebalancer 160 may be a software component run on the physical layer of the system 100.

A virtual machine 170 may run on any type of dependent, independent, compatible, and/or incompatible applications on the underlying hardware and OS 186. In an example, application 198A may run on virtual machine 170A and may be dependent on the underlying hardware and/or OS 186. In another example, applications 198B may run on virtual machine 170B and may be independent of the underlying hardware and/or OS 186. Additionally, applications 198A-B run on a virtual machine 170A-B may be compatible with the underlying hardware and/or OS 186. Applications 198A-B run on a virtual machine 170 may be incompatible with the underlying hardware and/or OS. In an example, a device may be implemented as a virtual machine 170. The hypervisor 180 manages hypervisor memory 184 for the host operating system 186 as well as memory allocated to the virtual machine 170A-B and guest operating system 196. Applications 198A-B may have virtual queues for storing I/O commands before the I/O commands are dispatched for processing.

Running on the virtual machine 170A-B may be one or more containers 197A-B. Each container (e.g. container 197A) may have a respective virtual queue (e.g. 199A). The virtual queue 199A may store I/O commands from the container 197A before the I/O commands are dispatched for processing. The virtual machine 170A-B may further include an orchestrator 195A-B. The orchestrator 195A may create container 197A when needed and remove container 197A when no longer needed. Container 197A may share the kernel of virtual machine 170A. Also, container 197A may contain an application or a component of an application.

Figure 2:
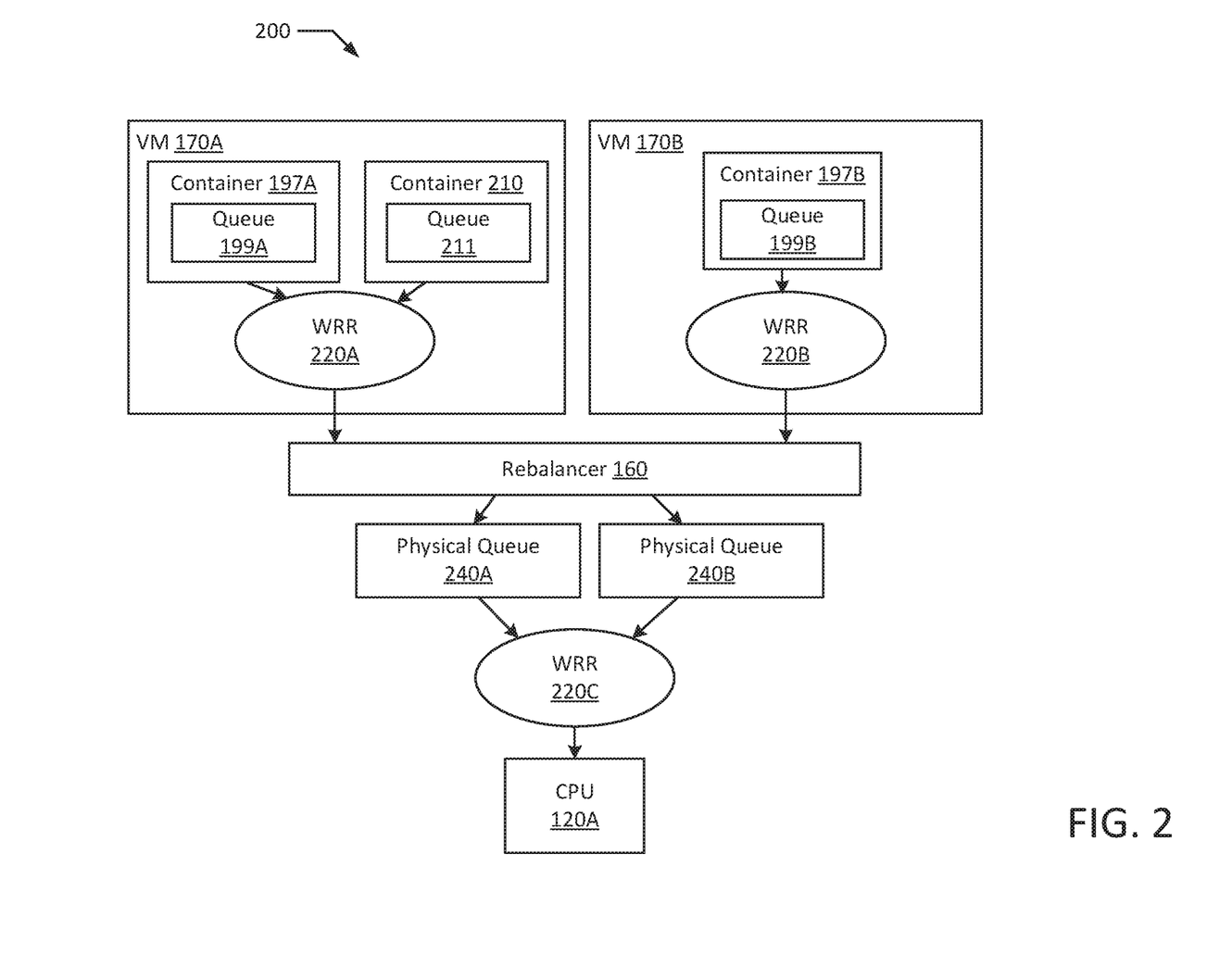
FIG. 2 is a block diagram of a virtual queue rebalancing system according to an example of the present disclosure.

FIG. 2 is a block diagram of a submission queue rebalancing system according to an example of the present disclosure. The example system 200 may include virtual machine 170A and virtual machine 170B. Virtual machine 170A may include container 197A, container 210, and weighted round robin (WRR) 220A. Container 197A may include a queue 199A and container 210 may include queue 211. Queue 199A may include I/O commands from container 197A. Queue 199A may be a virtual submission queue in an NVMe system. Queue 211 may include I/O commands from container 210. Queue 211 may be a virtual submission queue in an NVMe system. Queue 199A and queue 211 may dispatch or send I/O commands to WRR 220A. WRR 220A may provide for the transmission of I/O commands to a rebalancer 160. Virtual machine 170A includes containers 197A & 210, and in an example, queue 199A may include more I/O commands than queue 211. However, in this example, queue 211 may include more higher prioritized I/O commands than queue 197A. Accordingly, WRR 220A may arbitrate I/O commands based on a prioritization of the I/O commands, ensuring that higher prioritized I/O commands are sent to rebalancer 160 more frequently than lower prioritized I/O commands. Alternatively, WRR 220A may employ first-in-first-out to send the first received I/O command to rebalancer 160, followed by the second I/O command, followed by the third I/O command, etc.

Virtual machine 170B may include container 197B and WRR 220B. Container 197B may include queue 199B. Queue 199B may be a virtual submission queue. Queue 199B may include I/O commands from container 197B. Queue 199B may send I/O commands to WRR 220B. WRR 220B may provide for the transmission of I/O commands to a rebalancer 160. WRR 220B may arbitrate I/O commands based on a prioritization of the I/O commands, ensuring that higher prioritized I/O commands are send to rebalancer 160 more frequently than lower prioritized I/O commands. Alternatively, WRR 220B may employ first-in-first-out to send the first received I/O command to rebalancer 160, followed by the second I/O command, followed by the third I/O command, etc.

Virtual machine 170A-B may include one container 197B, two containers 197A & 210 or many containers 197A-B & 210. Each container 197A-B & 210 may include one queue 199A-B & 211 respectively. Containers 197A & 210 may share a queue.

Rebalancer 160 may receive I/O commands from one or more WRR 220A-B. Rebalancer 160 may detect a priority of each received I/O command. Rebalancer 160 may detect a quantity of commands in each queue 199A-B & 211. The priority of each received I/O command may depend on the type of I/O command. The priority of each received I/O command may depend on a priority of the container 197A that the I/O command came from. Rebalancer 160 may assign a new priority to each I/O command based on a quantity of virtual queues 199A & 211 in the virtual machine 170A. Rebalancer 160 may assign a new priority to each I/O command based on the detected priority of the I/O command.

Rebalancer 160 may send the I/O commands with new priorities to a physical queue 240A-B. For example, rebalancer 160 may send the I/O commands with new priorities to a single physical queue 240A. In another example, rebalancer 160 may send the I/O commands to more than one physical queue 240A-B. The I/O commands with new priorities may be sent to a WRR 220C to be reordered for processing. Physical queue 240A-B and WRR 220C may be part of rebalancer 160. Physical queue 240A-B and WRR 220C may be discrete components that rebalancer 160 has access to. WRR 220C may receive I/O commands with new priorities from the physical queue 240A-B and may transmit the I/O commands to physical CPU 120A. WRR 220C may arbitrate I/O commands based on a prioritization of the I/O commands, ensuring that higher prioritized I/O commands are send to the physical CPU 120A more frequently than lower prioritized I/O commands. Alternatively, WRR 220C may employ first-in-first-out to send the first received I/O command to the physical CPU 120A, followed by the second I/O command, followed by the third I/O command, etc. The CPU 120A may execute the I/O commands.

Figure 3:
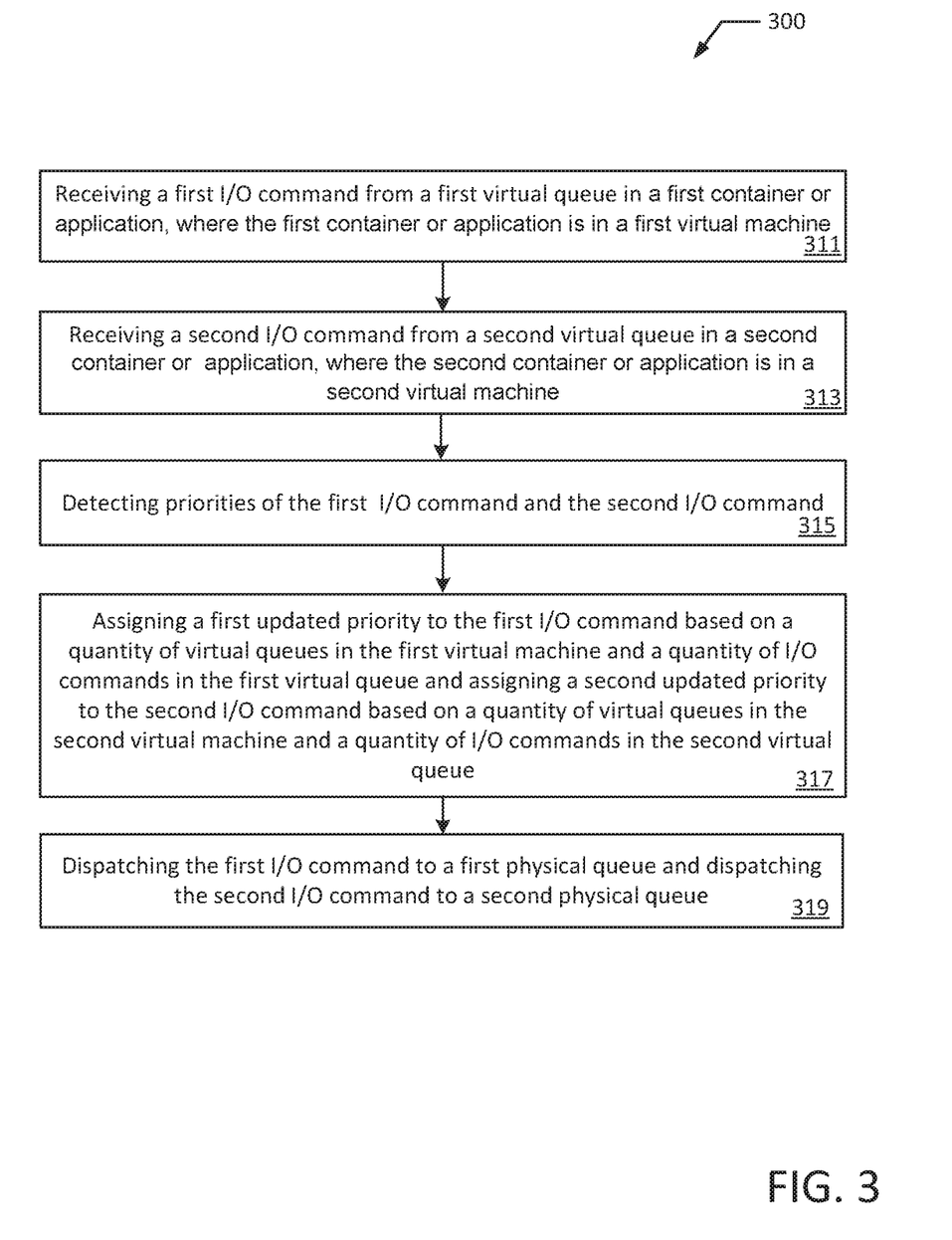
FIG. 3 is a flowchart illustrating an example method for rebalancing I/O commands according to an example of the present disclosure.

FIG. 3 is a flow diagram illustrating an example method for rebalancing I/O commands according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. In an example, the method 300 may be performed by processing logic that may comprise hardware (circuitry, dedicated logic, etc.), software, or a combination of both.

The example method 300 starts with a rebalancer receiving an I/O command from a virtual queue in a first container or application, where the first container or application is in a first virtual machine (block 311). For example, rebalancer 160 may receive a standard priority read command from queue 199A, where queue 199A may be in a high priority container 197A. Container 197A may be in virtual machine 170A. Virtual queue 199A may receive I/O commands from container 197A.

In another example, rebalancer 160 may receive a standard priority read command from a queue 199A, where queue 199A may be in a high priority application 198A. Application 198A may be in virtual machine 170A and virtual queue 199A may receive I/O commands from application 198A.

The rebalancer may receive a second I/O command from a second virtual queue in a second container or application, where the second container or application is in a second virtual machine (block 313). For example, rebalancer 160 may receive a high priority data wipe command from queue 199B, where queue 199B may be in a standard priority container 197B. Container 197B may be in virtual machine 170B. Virtual queue 199B may receive I/O commands from container 197B.

In another example, rebalancer 160 may receive a high priority data wipe command from a queue 199B, where queue 199B may be in a high priority application 198B. Application 198B may be in virtual machine 170A and virtual queue 199B may receive I/O commands from application 198B. I/O commands may have priorities associated with each command. For example, the first I/O command may have come from a container 197A where all I/O commands originating in that container 197A are given a higher priority. Container 197A may be a premium container where a user paid an additional fee for increased priority and all I/O commands from that container 197A may have a higher container priority as a result. User status may be included in the container priority. A user with higher status may receive a higher container priority based on the status. User status may be based on a role the user has. Application status, the status an application has in a system may cause a container 197A to have a higher container priority. Further, operation status, the status of an operation, may cause a container 197A to have a higher container priority. A container 197A may assign a container priority and a command priority to an I/O command. Similarly, application 198A may assign an application priority to an I/O command. A container 197A may assign an application priority to an I/O command if an application is running on the container 197A. Other command types may warrant an increased priority based on the operation associated with the I/O command. A container may be a standard usage container and all I/O commands originating in that container may be given a standard priority.

Further, commands originating from certain applications may have different priorities associated with the command, an application priority. For example, an I/O command from a database application may have a higher application priority than an I/O command originating from a word processing application.

The rebalancer may detect priorities of the first I/O command and priorities of the second I/O command (block 315). For example, rebalancer 160 may detect that the first I/O command is a standard priority read command and that the second I/O command is a high priority data wipe command. The I/O command may include a command field in the header of the I/O command. Rebalancer 160 may read the command field of the I/O command to detect the priority of the I/O command. The command field may include information about the container 197A from which the command originated and information about the type of command the I/O command is.

The rebalancer may assign an updated priority to the first I/O command based on a quantity of virtual queues in the first virtual machine and a quantity of I/O commands in the first virtual queue and further assign an updated priority to the second I/O command based on a quantity of virtual queues in the second virtual machine and a quantity of I/O commands in the second virtual queue (block 317). For example, rebalancer 160 may assign an updated priority to the standard priority read command based on a quantity of virtual queues (e.g., two queues 199A & 211 in virtual machine 170A of FIG. 2) in virtual machine 170A and a quantity of I/O commands in the virtual queue 199A. Virtual queue 199A may have fifty I/O commands queued waiting for transmission. Rebalancer 160 may further assign an updated priority to the high priority data wipe command based on a quantity of virtual queues (e.g., one queue 199B in virtual machine 170B of FIG. 2) in virtual machine 170B and a quantity of I/O commands in the virtual queue 199B. Virtual queue 199B may have one I/O command queued waiting for transmission. The updated priority may be based on the original priority of the I/O command multiplied by the quantity of I/O commands in the virtual queue. Rebalancer 160 may assign a higher priority to the read command coming from the queue with fifty I/O commands waiting for transmission. Rebalancer 160 may assign a lower priority to the data wipe command coming from a queue with only one I/O command waiting for transmission.

The rebalancer may then dispatch the first I/O command to a first physical queue and the second I/O command to a second physical queue (block 319). For example, the first I/O command, with an updated priority, may be dispatched to a first physical queue 240A and the second I/O command, with an updated priority, may be dispatched to a second physical queue 240B. Each physical queue 240A-B may have a weight assigned to the physical queue 240A-B, and may receive a proportion of I/O commands based on the weight of the queue 240A-B. A queue 240A that has a higher assigned weight may receive more I/O commands than a queue 240B that has a lower assigned weight. In another example, the I/O commands may be dispatched to a physical queue 240A based on a capacity to handle I/O commands of the physical queue or based on an availability capacity. For example, a first physical queue 240A may have a higher capacity (e.g., more space, access to faster processors, etc.) to handle I/O commands than a second physical queue 240B, and may receive more I/O commands. In another example, a first physical queue 240A may have more open or available space than a second physical queue 240B and may receive more I/O commands due to the open or available space. In another example, I/O commands may be dispatched evenly to all physical queues 240A-B in a system.

Alternatively, the I/O commands may be sent to the same physical queue 240A. In such an example, there may be only one physical queue, and all I/O commands from rebalancer 160 may be sent to that physical queue.

The I/O commands with updated priorities may then be dispatched from the physical queue 240A-B to a WRR 220C. The WRR 220C may reorder the I/O commands based on the updated priorities of the I/O commands. The WRR 220C may dispatch the I/O commands to a processor or CPU 120A.

Figure 4A:
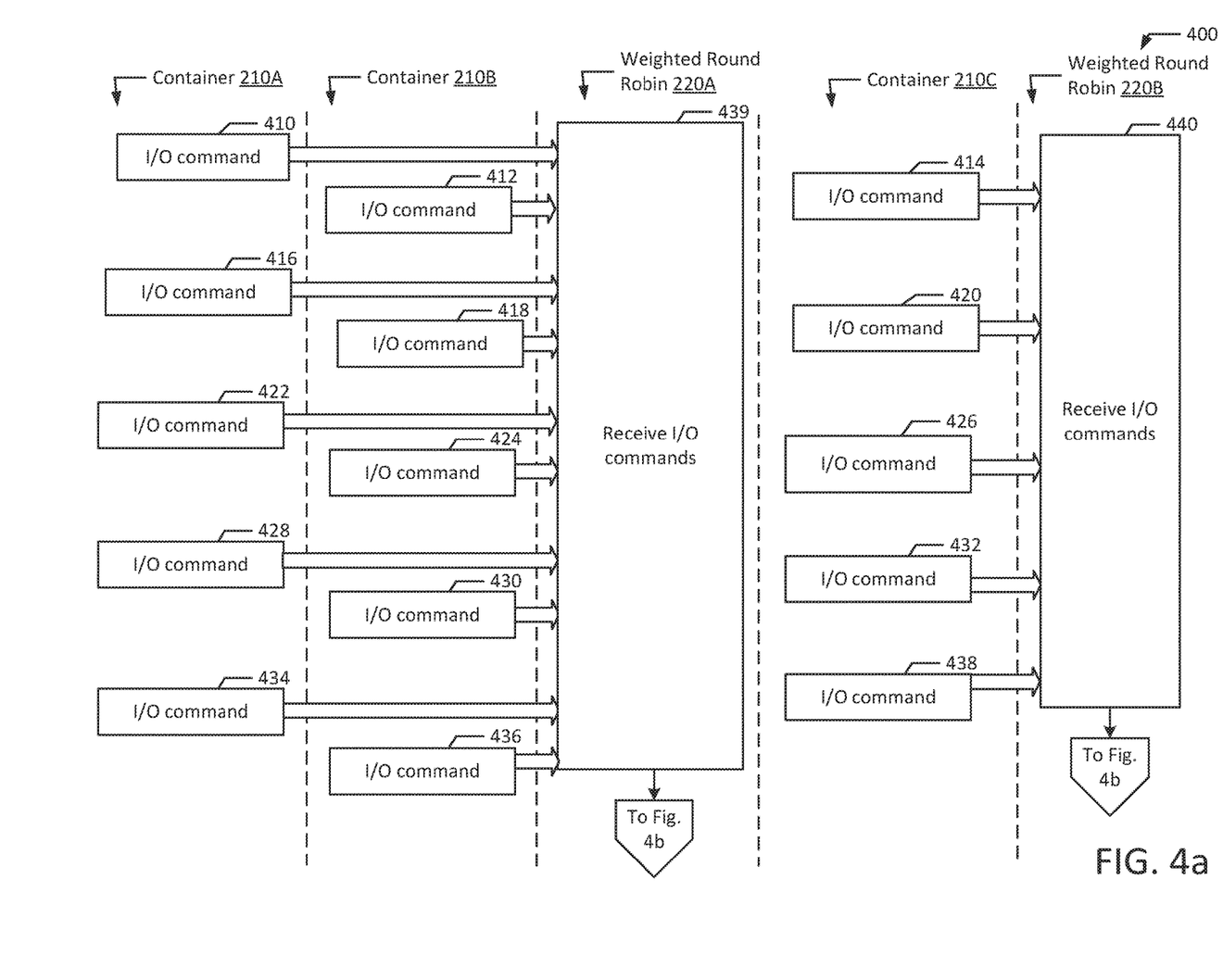
FIGS. 4a and 4b are flow diagrams of I/O command rebalancing according to an example of the present disclosure.
Figure 4B:
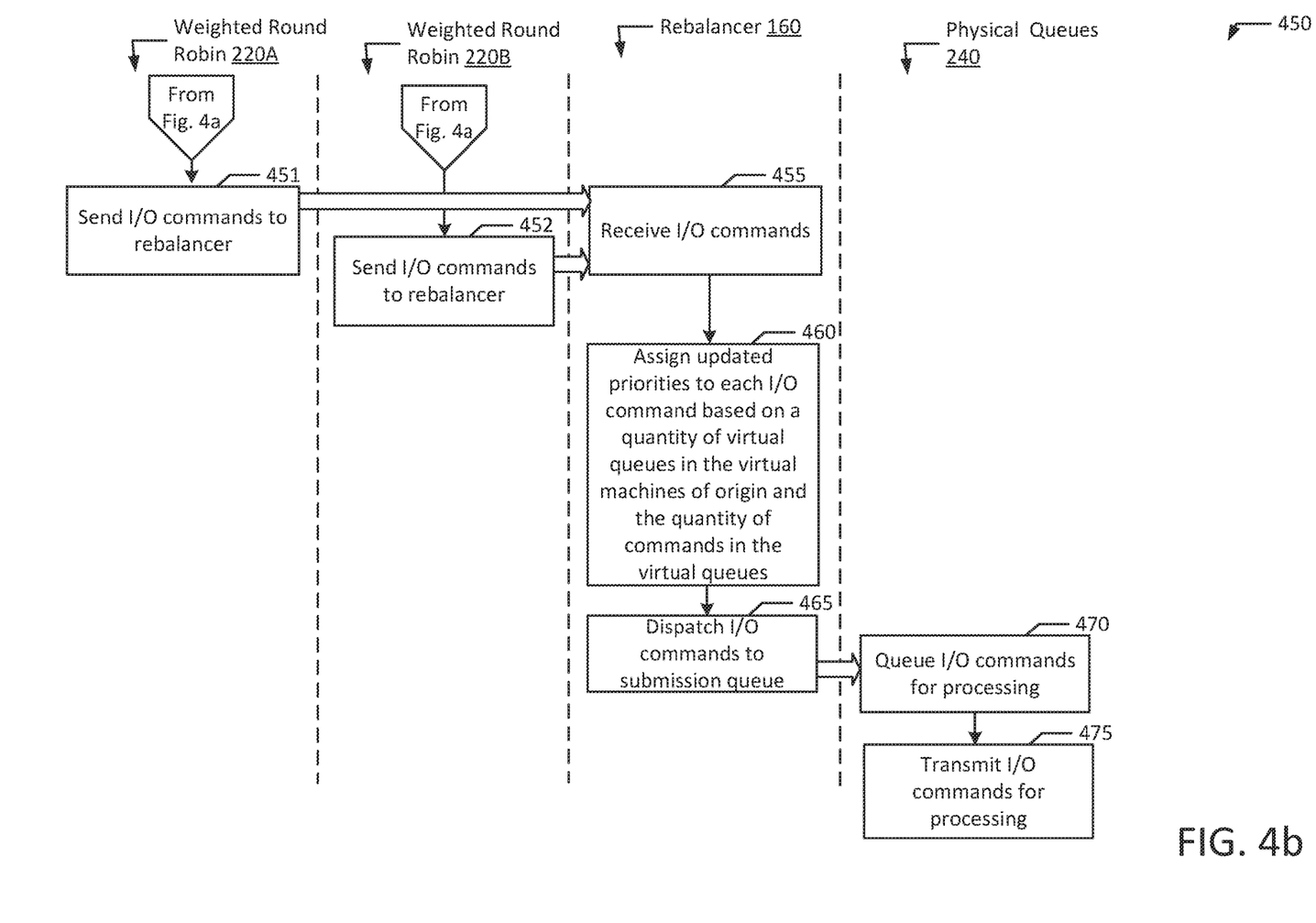

FIGS. 4a and 4b are block diagrams of I/O command rebalancing according to an example of the present disclosure. FIG. 4a depicts an example process 400 showing a first WRR 220A receiving I/O commands from containers 210A & 210B and a second WRR 220B receiving I/O commands from a third container 210C. For example, containers 210A & 210B may be on a first virtual machine 170A and container 210 may be on a second virtual machine 170B. Container 210A may be a high priority container, such that the container priority is high. In an enterprise system, a user may have paid for higher priority. Container 210B & 210C may be standard priority containers, such that the container priority is standard. Each I/O command may have a priority assigned to the command regardless of whether the I/O command is from a standard priority container or a high priority container.

WRR 220A may receive I/O commands from a first container 210A and a second container 210B (block 439). WRR 220B may receive I/O commands from a third container 210C (block 440). The I/O commands may come from virtual queues on the containers 210A-C. WRR 220A may receive a first I/O command 410 having a low priority from a first container 210A, the first container 210A may have a high priority. The first I/O command 410 may be a write command. The first container 210A may belong to a user who paid for a higher processing priority. WRR 220A may receive a second I/O command 412 having a high priority from a second container 210B, the second container 210B may have a standard priority. The second I/O command 412 may be a wipe command and the second container 210B may belong to a standard user. WRR 220B may receive a third I/O command 414 having a low priority from a third container 210C, the third container 210C may have a standard priority. The third I/O command 414 may be a read command and the third container 210C may belong to a standard user.

WRR 220A may receive a fourth I/O command 416, a read command, having a low priority from the first container 210A. WRR 220A may receive a fifth I/O command 418, a write command, having a low priority from the second container. WRR 220B may receive a sixth I/O command 420, a write command, having a low priority from the third container 210C. WRR 220A may receive a seventh I/O command 422, a read command, having a low priority from the first container 210A. WRR 220A may receive an eighth I/O command 424, a data wipe command, having a high priority from the second container 210B. WRR 220B may receive a ninth I/O command 426, a data wipe command, having a high priority from the third container 210C. WRR 220A may receive a tenth I/O command 428, a data wipe command, having a high priority from the first container 210A. WRR 220A may receive an eleventh I/O command 430, a data wipe command, having a high priority from the second container 210B. WRR 220B may receive a twelfth I/O command 432, a write command, having a low priority from the third container 210C. WRR 220A may receive a thirteenth I/O command 434, a data wipe command, having a high priority from the first container 210A. WRR 220A may receive a fourteenth I/O command 436, a write command, having a low priority from the second container 210B. WRR 220B may receive a fifteenth I/O command 438, a data wipe command, having a high priority from the third container 210C.

FIG. 4b depicts an example process 450 showing rebalancer 160 receiving I/O commands, updating command priorities and dispatching I/O commands for processing. WRR 220A may send the received I/O commands to rebalancer 160 (block 451). As part of sending the I/O commands, WRR 220A may reorder the I/O commands based on the priority of the I/O commands. WRR 220A may send I/O commands such that three out of every five I/O commands are high priority commands, this may be known as a 3/5 requirement. For example, WRR 220A may send rebalancer 160: the second I/O command 412, followed by the eighth I/O command 424, followed by the tenth I/O command 428, followed by the first I/O command 410, followed by the fourth I/O command 416, followed by the eleventh I/O command 430, followed by the thirteenth I/O command 434, followed by the fifth I/O command 418, followed by the seventh I/O command 422, followed by the fourteenth I/O command 436. In this example, the order of I/O commands is determined by the 3/5 requirement of WRR 220A. WRR 220A may use additional requirements which would accordingly change the order of I/O commands sent from WRR 220A to rebalancer 160.

WRR 220B may send the received I/O commands to rebalancer 160 (block 452). As part of sending the I/O commands, WRR 220B may reorder the I/O commands based on the priority of the I/O commands. WRR 220B may send I/O commands such that three out of every five I/O commands are high priority commands. For example, WRR 220B may send rebalancer 160: the ninth I/O command 426, followed by the fifteenth I/O command 438, followed by the third I/O command 414, followed by the sixth I/O command 420, followed by the twelfth I/O command 432. In this example, the order of I/O commands is determined by the 3/5 requirement of WRR 220B. WRR 220B may use additional requirements which would accordingly change the order of the I/O commands sent from WRR 220B to rebalancer 160.

Rebalancer 160 receives the I/O commands (block 455). Rebalancer 160 may receive the I/O commands in the order the WRR 220A-B sends them. The WRR 220A-B may send the I/O commands one at a time. The WRR 220A-B may send the I/O commands in groups or batches including multiple I/O commands.

Rebalancer 160 may detect a container priority of the first container 210A, a container priority of the second container 210B, and a container priority of the third container 210C. Rebalancer 160 may detect a quantity of virtual queues 199A-B & 211 of each virtual machine where the I/O commands are originating. Rebalancer 160 may also detect a quantity of virtual queues 199A-B & 211 of each container 210A-C in the virtual machines where the I/O commands are originating. Rebalancer 160 may detect a priority associated with each I/O command. The command priority may be found in an I/O command header. Rebalancer 160 may also detect an application priority of an application from which the I/O command originates. A high application priority may be associated with a real-time application such as a video-streaming application, a database operation application, or a disk maintenance application. A low application priority may be associated with an application such as a word processing application, a data backup application, or a file indexing application.

Rebalancer 160 assigns an updated priority to each I/O command (block 460). The updated priority may be based on a quantity of virtual queues 199A-B & 211 in the virtual machine 170A-B of origin and/or the quantity of I/O commands in those virtual queues 199A-B & 211. Further, the updated priority may be based on the detected values detected by rebalancer 160.

For example, the updated priorities may rank, and accordingly assign an updated priority to each I/O command, the high priority I/O commands from the high priority container 210A above high priority I/O commands from a standard priority container 210B-C, which may be ranked higher than low priority commands from a high priority container 210A, which may be ranked higher than low priority commands from a standard priority container 210B-C. After rebalancer 160 assigns an updated priority, the tenth and thirteenth I/O commands 428 & 434 may be ranked as a highest priority, as high priority I/O commands from a high priority container 210A. The second, eighth, ninth, eleventh, and fifteenth I/O commands 412, 424, 426, 430, & 438 may be ranked as a second highest priority, as high priority commands from a standard priority container 210B-C. The first, fourth, and seventh I/O commands 410, 416, & 422 may be ranked as a third highest priority, as low priority commands from a high priority container 210A. The third, fifth, sixth, twelfth and fourteenth I/O commands 414, 418, 420, 432, & 436 may be ranked as a fourth highest priority, as low priority commands from a standard priority container 210B-C.

The I/O commands with updated priorities are dispatched to a physical submission queue (block 465). The I/O commands may be sent in the same order in which rebalancer 160 received the I/O commands.

Physical queues 240A-B queue the I/O commands with updated priorities for processing (block 470).

Physical queues 240A-B transmit the I/O commands with updated priorities for processing (block 475). The physical queues 240A-B may dispatch or send the I/O commands to a WRR 220C for reordering. The WRR 220C may ensure that the updated priorities are accounted for as the I/O commands are processed. WRR 220C may ensure that the I/O commands are processed by CPU 120A according to the updated priorities of the I/O commands. For example, WRR 220C may ensure all of the highest priority I/O commands 428 & 434 are processed first, all of the second highest priority I/O commands 412, 424, 426, 430, & 438 are processed second, all of the third highest priority I/O commands 410, 416, & 422 are processed third, and all of the fourth highest priority I/O commands 414, 418, 420, 432, & 436 are processed fourth.

In another example, WRR 220C may ensure that four out of every eight commands are of the highest priority, two out of every eight commands are of a second highest priority, and one out of every eight commands is of a third highest priority and one out of every eight commands is of the remaining priorities. If there are no commands of a given priority, WRR 220C may use the next highest available priority to fulfill the higher priority ratio. In such an example, WRR 220C may send the highest priority I/O commands 428 and 434, followed by four of the second highest priority I/O commands 412, 424, 426, 438, followed by one of the third highest priority commands 410, followed by one of the remaining priority commands, 414.

Without rebalancer 160 to assign updated priorities, a high priority container 210A may not receive the resources desired and/or expected. For example, without rebalancer 160, and without any WRR 220A-C, I/O commands may be processed in a first-in-first-out (FIFO) scheme. Accordingly, the order of I/O commands in a FIFO scheme would be the first command 410, followed by a second I/O command 412, followed by a third I/O command 414, followed by a fourth I/O command 416, followed by a fifth I/O command 418, followed by a sixth I/O command 420, followed by a seventh I/O command 422, followed by an eighth I/O command 424, followed by a ninth I/O command 426, followed by a tenth I/O command 428, followed by an eleventh I/O command 430, followed by a twelfth I/O command 432, followed by a thirteenth I/O command 434, followed by a fourteenth I/O command 436, followed by a fifteenth I/O command 438.

In another example, without rebalancer 160 and with WRR 220A-C, only the I/O command priorities would be used by WRR 220A-C and the I/O commands would be based on the command priorities. WRR 220A would send to the physical queue 240A, the second I/O command 412, followed by the eight I/O command 424, followed by the tenth I/O command 428, followed by the first I/O command 410, followed by the fourth I/O command 416, followed by the eleventh I/O command 430, followed by the thirteenth I/O command 434, followed by the fifth I/O command 418, followed by the seventh I/O command 422, followed by the fourteenth I/O command 436. WRR 220B may send, to the physical queue 240B, the ninth I/O command 426, followed by the fifteenth I/O command 438, followed by the third I/O command 414, followed by the sixth I/O command 420, followed by the twelfth I/O command 432.

WRR 220C, using a 3/5 requirement, may then send to the processor 120A the second I/O command 412, the ninth I/O command 426, the eighth I/O command 424, the fifteenth I/O command 438, the tenth I/O command 428, the thirteenth I/O command 434, the eleventh I/O command 430, the third I/O command 414, the first I/O command 410, the sixth I/O command 420, the fourth I/O command 416, the twelfth I/O command 432, the seventh I/O command 422, the fifth I/O command 418 and the fourteenth I/O command 436. The weighted round robin may not be able to detect a quantity of virtual queues present in a virtual machine of origin, a quantity of I/O commands in each queue, a container priority or an application priority. Rebalancer 160 detects these priorities, and reassigns an updated priority to each I/O command.

Without rebalancer 160 to reassign a priority to each I/O command, command priorities and container priorities may not be consistently honored by the I/O command processing system. Rebalancer 160 advantageously provides full enforcement of priorities, over a scheduler or a WRR.

Even when the original priorities in two different virtual machines 170A & 170B are not compatible, a rebalancer may ensure that I/O commands are processed according to their respective priorities. For example, virtual machine 170A may include I/O command priorities of gold, silver, and bronze, while virtual machine 170B may include I/O command priorities of A and B. In such a case, rebalancer may assign updated priorities to each I/O command by accounting for a quantity of virtual queues present in a virtual machine of origin, a quantity of I/O commands in each queue, a container priority, an application priority and a command priority.

In another example, a first virtual machine may include three virtual queues. A first virtual queue in a first application may have fifteen I/O commands, a second virtual queue in a second application may have fifty I/O commands, and a third virtual queue in a third application may have two I/O commands. A second virtual machine may have fourth virtual queue in a fourth application with five I/O commands.

The second application may have a high application priority and each of the first, third, and fourth applications may have the same standard application priority; the I/O commands from the first virtual queue may have a high priority; and the I/O commands from the second, third, and fourth virtual queues may have a standard priority.

The first virtual machine may have a first WRR to send I/O commands to a rebalancer and the second virtual machine may have a second WRR to send I/O commands to the rebalancer. The rebalancer may receive commands from the first WRR such that it receives the high priority commands from the first virtual queue before the standard priority commands from the second and third virtual queues. The rebalancer may receive commands from the second WRR in the order the commands are issued as the second WRR only receives standard priority I/O commands from the fourth virtual queue.

The rebalancer then may determine the number of virtual queues in each virtual machine (e.g., three virtual queues in the first virtual machine and one virtual queue in the second virtual machine) and the quantity of I/O commands in each virtual queue (e.g., fifteen in the first virtual queue, fifty in the second virtual queue, two in the third virtual queue and five in the fourth virtual queue).

The rebalancer then assigns updated priorities to each I/O command and sends the I/O commands to a physical queue, where a third WRR may reorder the I/O commands based on their updated priorities. The rebalancer may assign priorities such that the standard priority I/O commands from standard application priority virtual queues with two I/O commands have a lower priority than standard priority commands from high application priority virtual queues with fifty I/O commands. The rebalancer may assign a numerical value to a command priority and a different numerical value to an application priority. The rebalancer may then multiply the numerical command priority by the numerical application priority and further by the number of I/O commands in the virtual queue of origin to obtain an updated priority. The rebalancer may further multiply by the number of virtual queues in the virtual machine to obtain the updated priority.

In doing so, the rebalancer may ensure that standard priority commands from standard priority application queues are not processed sooner based solely on the fact that there are less commands in that queue, instead the rebalancer ensures that I/O commands are processed according to a quantity of virtual queues present in a virtual machine of origin, a quantity of I/O commands in each queue, a container priority, an application priority and a command priority.

Without the rebalancer, for example, the I/O commands would have been sent to the physical queues from a third WRR such that the fifteen high priority commands from the first virtual queue were queued in the physical queue before other commands. The remaining commands may be queued irrespective of any application priority, causing commands from the fourth virtual queue with a standard application priority to be processed at a higher frequency than the commands from the second virtual queue with high application priority. Advantageously, the rebalancer may assign an updated priority to the I/O commands ensuring that priorities are honored by the system.

Figure 5:
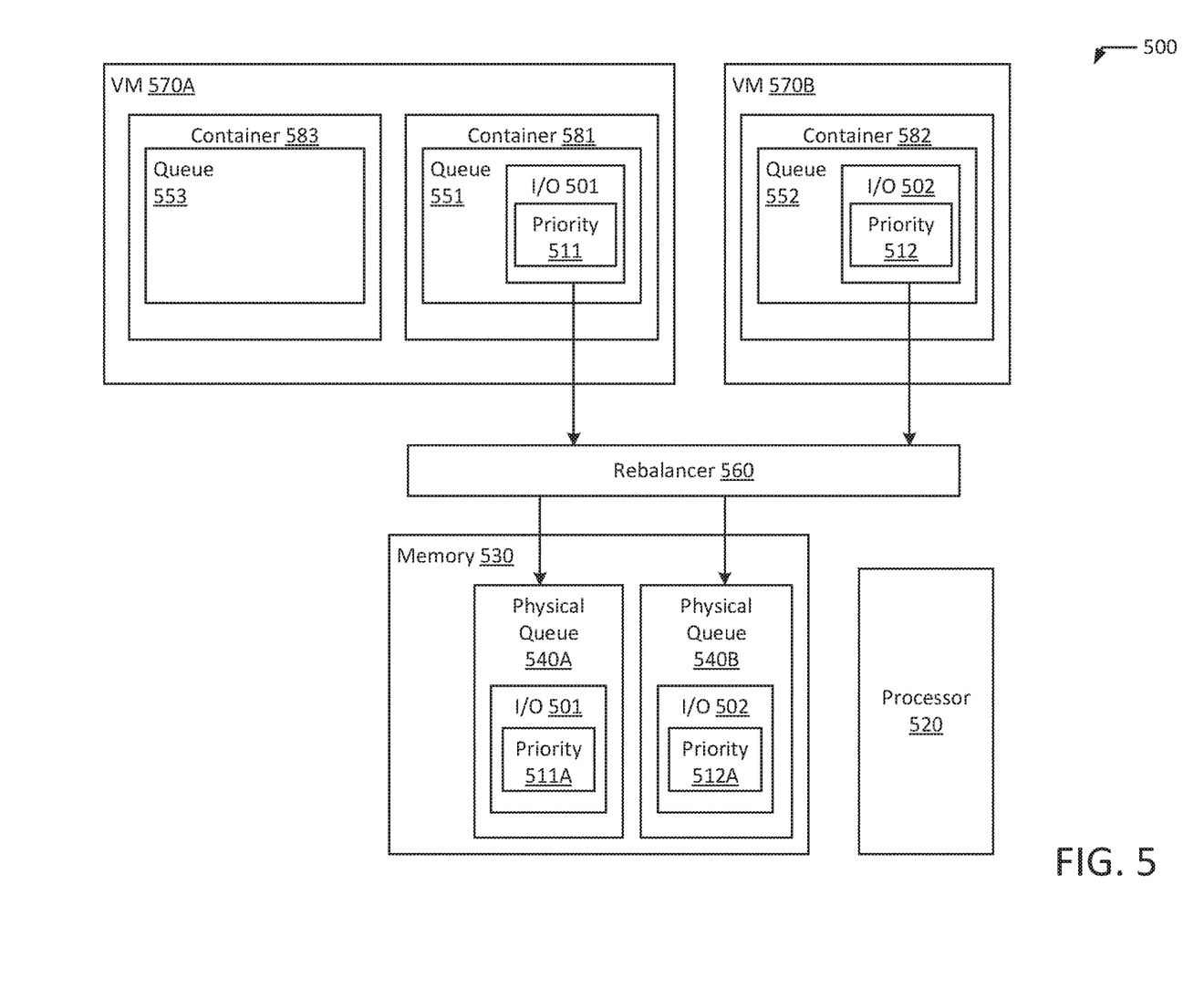
FIG. 5 is a block diagram of a virtual queue rebalancing system according to an example of the present disclosure.

FIG. 5 is a block diagram of a submission queue rebalancing system according to an example of the present disclosure. System 500 includes a memory 530 coupled to a processor 520 and a rebalancer 560. Rebalancer 560 receives I/O command 501 from virtual queue 551. Virtual queue 551 is located on container 581, which is located within virtual machine 570A. Rebalancer 560 also receives I/O command 502 from virtual queue 552. Virtual queue 552 is located on container 582, which is located within virtual machine 570B. Virtual machine 570A may include a second container 583 with virtual queue 553. Rebalancer 560 detects a priority 511 of I/O command 501 and a priority 512 of I/O command 502. Rebalancer 560 assigns an updated priority 511A to I/O command 501 and an updated priority 512A to I/O command 502. The updated priority 511A is based on a quantity of virtual queues 551 & 553 in virtual machine 570A and a quantity of I/O commands in queues 551 & 553. The updated priority 512A is based on the quantity of virtual queues 552 in virtual machine 570B and a quantity of I/O commands in queue 552. Rebalancer 560 dispatches I/O command 501 to physical queue 540A and I/O command 502 to physical queue 540B.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, or any other similar devices. The instructions may be configured to be executed by one or more processors, which when executing the series of computer instructions, performs or facilitates the performance of all or part of the disclosed methods and procedures.

The invention claimed is:

1. A method of queuing I/O commands, comprising:
receiving a first I/O command having a first priority selected from the group consisting of a first application priority, a first command priority, and combinations thereof, from a first virtual queue in at least one of a first container and a first application;
receiving a second I/O command having a second priority selected from the group consisting of a second application priority and a second command priority, and combinations thereof, from a second virtual queue in at least one of a second container and a second application;
detecting the first priority of the first I/O command and the second priority of the second I/O command;
assigning, at a rebalancer, a first updated priority to the first I/O command and a second updated priority to the second I/O command, wherein the rebalancer assigns the first updated priority based on a first quantity of virtual queues and a first quantity of I/O commands in the first virtual queue, and the rebalancer assigns the second updated priority based on a second quantity of virtual queues and a second quantity of I/O commands in the second virtual queue; and
dispatching the first I/O command to a first physical queue and the second I/O command to a second physical queue.

2. The method of claim 1, further comprising:
dispatching the first I/O command from the first physical queue to a weighted round robin; and
dispatching the second I/O command from the second physical queue to the weighted round robin.

3. The method of claim 2, wherein the weighted round robin reorders the first I/O command and the second I/O command based on the first updated priority and second updated priority and dispatches the first I/O command and the second I/O command to a processor.

4. The method of claim 1, wherein the at least one of a first container and a first application is in a first virtual machine, and wherein the at least one of a second container and a second application is in a second virtual machine.

5. The method of claim 4, wherein the first I/O command is dispatched to the first physical queue based on capacity in the first physical queue and the second I/O command is dispatched to the second physical queue based on capacity in the second physical queue.

6. The method of claim 1, wherein the first updated priority is further based on a first container priority and the second updated priority is further based on a second container priority.

7. The method of claim 6, wherein the container priority is based on at least one of a user status, an application status, and an operation status.

8. The method of claim 1, wherein the first priority is detected from a command field of the first I/O command.

9. A system for queuing I/O commands comprising:
a processor;
a memory; and
a rebalancer,
wherein the rebalancer:
receives a first I/O command having a first priority selected from the group consisting of a first application priority, a first command priority, and combinations thereof, from a first virtual queue in at least one of a first container and a first application;
receives a second I/O command having a second priority selected from the group consisting of a second application priority and a second command priority, and combinations thereof, from a second virtual queue in one of a second container and a second application;
detects the first priority of the first I/O command and the second priority of the second I/O command;
assigns a first updated priority to the first I/O command and a second updated priority to the second I/O command, wherein the first updated priority is based on a first quantity of virtual queues and a first quantity of I/O commands in the first virtual queue, and the second updated priority is based on a second quantity of virtual queues and a second quantity of I/O commands in the second virtual queue; and
dispatches the first I/O command to a first physical queue and the second I/O command to a second physical queue.

10. The system of claim 9, further comprising a weighted round robin that reorders the first I/O command and the second I/O command based on the first updated priority and second updated priority and dispatches the first I/O command and the second I/O command from the first physical queue and the second physical queue to the processor.

11. The system of claim 9, wherein the at least one of a first container and a first application is in a first virtual machine, and wherein the at least one of a second container and a second application is in a second virtual machine.

12. The system of claim 9, wherein the first physical queue is different from the second physical queue.

13. The method of claim 12, wherein the first I/O command is dispatched to a first physical queue based on capacity in the first physical queue and the second I/O command is dispatched to a second physical queue based on capacity in the second physical queue.

14. The system of claim 9, wherein the updated priorities are further based on a container priority.

15. The system of claim 14, wherein the container priority is based on at least one of a user status, an application status and an operation status.

16. The system of claim 9, further comprising an orchestrator that receives a command to create the first container and creates the first container.

17. The system of claim 16, wherein the orchestrator assigns the first priority to the first I/O command.

18. The system of claim 9, wherein the priority of the first I/O command is detected from a command field of the first I/O command.

19. The system of claim 9, wherein the rebalancer is a non-volatile memory express storage controller.

20. A non-transitory computer readable medium storing instructions, which when executed, cause a rebalancer to:
receive a first I/O command from a first virtual queue in at least one of a first container and a first application;
receive a second I/O command from a second virtual queue in at least one of a second container and second application;
detect a first priority of the first I/O command and a second priority of the second I/O command;
assign a first updated priority to the first I/O command and a second updated priority to the second I/O command, wherein the first updated priority is based on a first quantity of virtual queues and a first quantity of I/O commands in the first virtual queue, and wherein the second updated priority is based on a second quantity of virtual queues and a second quantity of I/O commands in the second virtual queue; and
dispatch the first I/O command to a first physical queue and the second I/O command to a second physical queue.

* * * * *